United States Patent Office 3,338,089
Patented Aug. 29, 1967

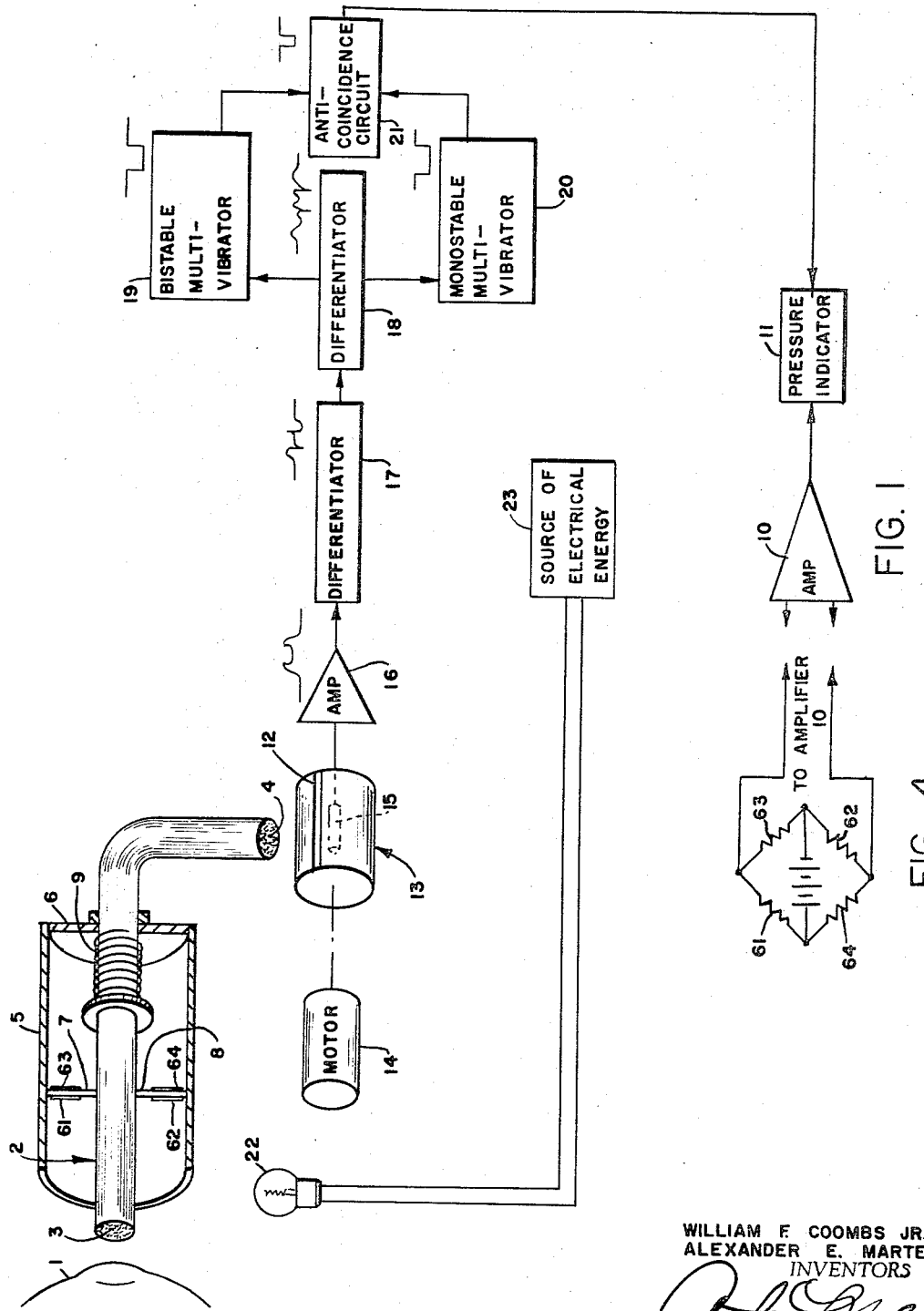

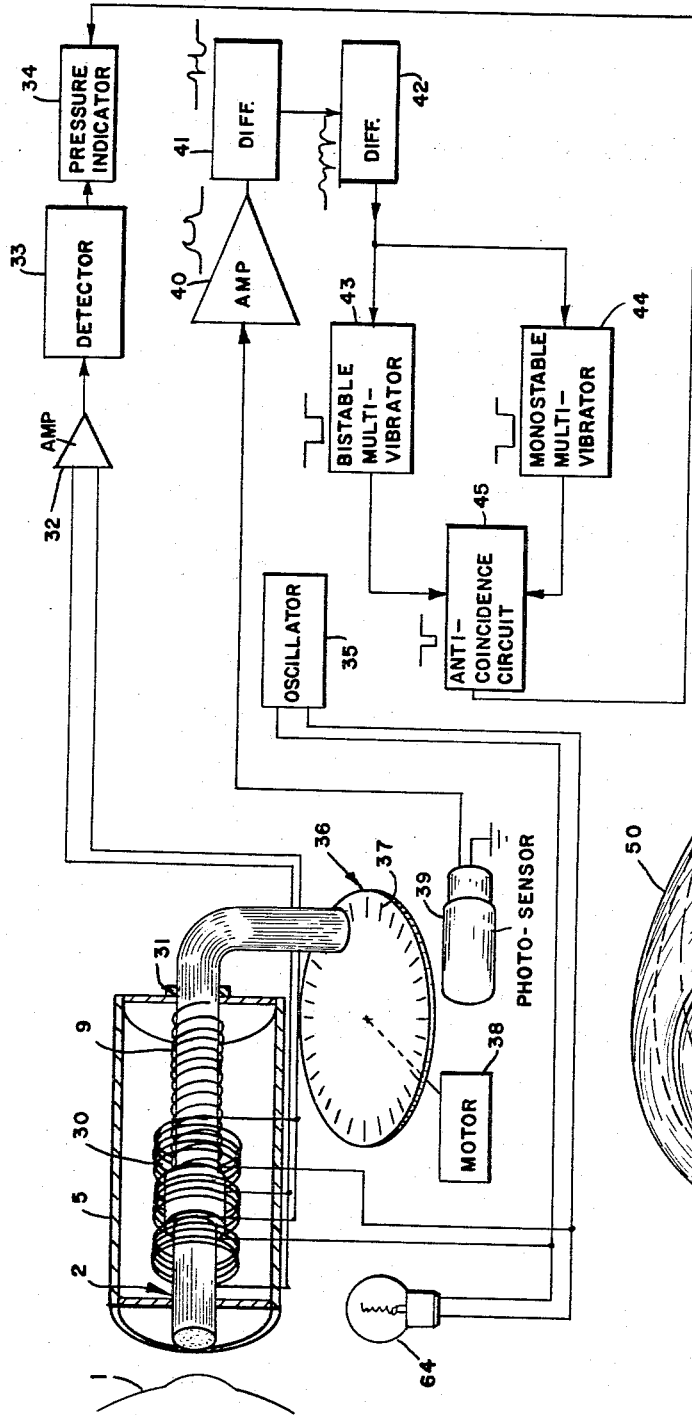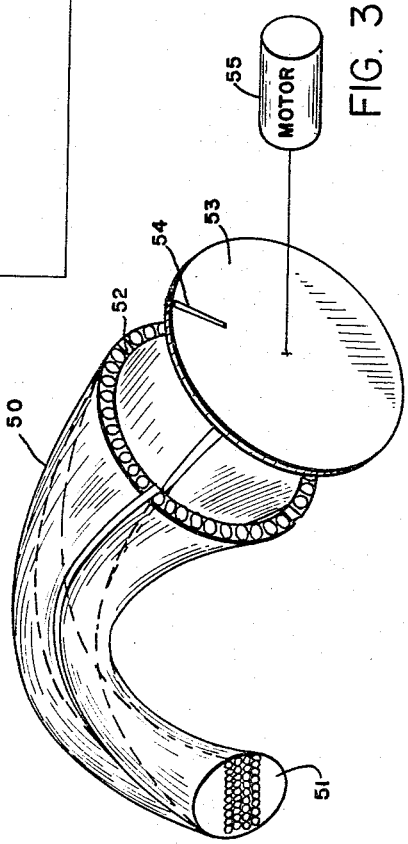

3,338,089
APPLANATION TONOMETER
William F. Coombs, Jr., Irondequoit, and Alexander E. Martens, Greece, N.Y., assignors to Bausch & Lomb Incorporated, Rochester, N.Y., a corporation of New York
Filed June 29, 1964, Ser. No. 378,846
11 Claims. (Cl. 73—80)

This invention relates to an applanation tonometer and more particularly to an applanation tonometer having an automatic sensing and recording means.

The measuring of tonometric pressure of the eye is a valuable clinical technique. The measurement of the intraocular pressure is achieved by a pressure sensitive apparatus. More specifically, however, tonometers used for measuring intraocular pressures are generally of two types. The first type being the indentation type which produces an indentation in the eyeball and thereby senses the indentation produced by a known force. The second general type is the applanation tonometer which merely flattens a portion of the eyeball which for the purpose of illustration will be considered spherical. If a limited portion of the eyeball is flattened a minimum of fluid within the eyeball is displaced and the pressure within the eyeball is sensed through this displacement. The amount of fluid displacement required to obtain a reading in an applanation tonometer is substantially less than that of the indentation tonometer. There are other factors affecting the tonometric reading such as rigidity of the cornea resisting elastic deformation, and the adhesion between the planar surface of the probe and the cornea due to the wetting liquid such as lachrymal fluid. These, however, produce cancelling forces and an accurate tonometric reading may be determined if the area of the eyeball which is flattened is kept to a minimum.

Conventionally a predetermined standard area is flattened to indicate a reading of tonometric pressure. A normal intraocular pressure will produce a normal direct reading in standard units of pressure. Variations from this normal will be directly indicated. Prior applanation tonometers require the operator to accurately place the probe on the eyeball, accurately determine when this diameter of area is reached, and then to read the pressure on a measuring instrument. This is a difficult and time consuming procedure and the chance of inaccuracies entering into the readings are present. The present invention provides an automatic recording means responsive to the flattening of a predetermined area caused by the planar surface contacting the eyeball.

It is an object of this invention to provide an applanation tonometer for indicating the intraocular pressure by flattening a portion of the eyeball with the tonometric probe.

It is another object of this invention to provide an applanation tonometer which automatically senses the diameter of the flattened area produced by the tonometer probe and directly indicates the intraocular pressure when this predetermined area has been reached.

It is a further object of this invention to provide an applanation tonometer which senses a predetermined diameter of a flattened portion produced by a planar surface on the applanation tonometer probe and electrically records the intraocular pressure through a transducer and electrical circuit.

The objects of this invention are accomplished by providing an illuminated applanation tonometer probe including a transducer having a probe displaced relative to the probe supporting structure. The displacement of the probe relative to the supporting structure initiates an electrical signal which provides a direct readout on a measuring instrument.

The contact of the eyeball with the planar surface of the probe produces a meniscus ring of which the circumference is enhanced by the use of fluorescein placed in the eye of the patient. The probe includes an optical system for relaying an image to a photosensing means. The photosensing means generates an electrical signal responsive to the optical signal which is compared to a standard electrical signal. When the time duration of the optically responsive electrical signal is of greater magnitude than a standard electrical signal then a hold signal is generated which holds the reading on the measuring device which provides a direct reading of the intraocular pressure of the patient. The operator merely places the planar surface of the tonometer probe to tangentially engage the peripheral surface of the cornea.

The preferred embodiments of this invention are subsequently described and are illustrated in the attached drawings.

FIG. 1 illustrates a schematic diagram of the applanation tonometer and block diagram of the circuit for recording the intraocular pressure.

FIG. 2 illustrates a modification of the tonometer and block diagram of the circuit for recording the intraocular pressure.

FIG. 3 illustrates more specifically a modification of the fiber bundle for transmitting an optical image to the scanning device.

FIG. 4 illustrates a suitable electrical diagram for the strain gages.

Referring to FIG. 1 the applanation tonometer is shown positioned adjacent to the eye 1 of a patient. The probe 2 as illustrated includes a fiber bundle which transmits an image from the planar surface 3 on the forward end of the probe to the exit end surface 4. A fiber bundle is a specific means of relaying the image of the meniscus formed on the contacting front surface 3 of the probe 2. Any optical system may be used which relays the image to the rearward end of the probe where an electrical sensing means is used to sense an image. The probe 2 is concentrically mounted within a housing 5. A disc 6 is retained within the housing 5 holding the probe centrally within the housing together with the strain gage supports 7 and 8. The illustration as shown is schematic and illustrative only and the inventors do not wish to limit the probe to the specific structure as a number of different means for permitting relative movement between the probe and the housing to generate an electrical signal may be provided. The contacting surface 3 engages a portion of the eye displacing the probe rearwardly against the force of the spring 9. This displacement generates an electrical signal in the strain gages 61, 62, 63 and 64. The strain gages are connected to an amplifier 10 which feeds into a suitable pressure indicator 11. The strain gages 61, 62, 63 and 64 operate as a transducer for converting a force to an electrical signal. It is preferable that the conversion of the force to an electrical signal be a linear relationship to provide an accurate reading. It is possible however, to utilize a non-linear relationship if a compensation is provided for the rigidity of the eyeball resisting elastic deformation and also compensating for the adhesive and cohesive qualities of the lachrymal fluid in the eye. It is also understood that the pressure is increased in the eye as the deformation of the eyeball caused by a greater area of contact is increased which may change the linearity of the relationship. For the purpose of illustration, however, it will be considered that the strain gages 61, 62, 63 and 64 generate a linear signal.

The strain gages 61, 62, 63 and 64 are schematically illustrated in FIG. 1. A suitable connection to a source of electrical energy and for connection to amplifier 10 is shown in FIG. 4. This arrangement balances out distortion effect in the strain gage and generates a true signal.

The light 22 emits radiation and is connected to a suitable source of electric energy 23. The purpose of the light 22 is to cause the fluorescein to create an image of suitable intensity for transmission through the probe 2.

The end surface 3 of the probe 2 is a polished surface to prevent any damage by the contact of the surface 3 with the eyeball. A fluorescein dye is used on the cornea to enhance the image which is created by the meniscus of the fluid in the eye surrounding the periphery of the area of contact. A fluorescein dye has proved to be very satisfactory for this purpose, however, the inventors do not limit the disclosure to the use of a fluorescein dye. An excitation light is used to produce an image adaptable to being transmitted through the probe and again it is maintained that the fundamental purpose of the light is to cause the dye to fluoresce and produce an optical image suitable for transmission through the probe. The opposite end of the probe 2 is scanned by a slit 12 on a rotating drum 13. The motor 14 rotates the drum and rapidly scans the surface 4 of the probe 2. A photosensor 15 senses a signal responsive to the fluorescein dye in the meniscus surrounding the area of contact of the probe with the eye. As the force of the probe is increased the are of contact is also increased and a corresponding electrical signal is generated in a photosensor 15. The photosensor 15 applies the electrical signal to the amplifier 16 where the signal is amplified and then differentiated by the two differentiators 17 and 18. The wave form of the signals applied and amplified in the amplifier 16 is shown adjacent to the amplifier. The signal from the differentiators 17 and 18 are shown adjacent the differentiators. A bistable multivibrator 19 generates a gating voltage as indicated by the waveform adjacent the bistable multi-vibrator 19. The mono-stable multi-vibrator 20 generates a signal of a constant gate width as indicated by the waveform adjacent the mono-stable multi-vibrator. These two signals are then compared in the anti-coincidence circuit 21. When a signal exists in the bistable multi-vibrator 19 and no signal exists in the mono-stable multi-vibrator 20 then the anti-coincidence circuit 21 generates a "hold" pulse which is applied to the pressure indicator which locks the reading on the indictaor. The reading indicates the intraocular pressure when a predetermined area of the eyeball is flattened.

Referring to FIG. 2 the eye 1 is shown adjacent to the probe 2. The probe 2 is associated with the linear differential transformer 30 which is fixed relative to the housing 5. The spring 9 biases the probe 2 to the position as indicated and is stopped in this position by the shoulder 31. As the probe is placed on the eye 1 the probe is biased to a rearward position generating an electrical signal in the linear differential transformer 30 which is applied to the amplifier 32. The detector 33 relays a signal to the pressure indicator 34. The indicator 34 may be any suitable visual indicating or recording device for indicating the intraocular pressure of the eye. The light source 64 causes the fluorescein in the eye to luminesce and emit a signal relay by the probe 2 to the scanning device. The light 64 is energized by the oscillator 35 which is also connected to the transformer 30. The scanner includes a disc 36 with a plurality of slits 37 in the radial outer portion of the disc. As the motor 38 rotates the disc 36 each slit scans the exit surface of the probe 2 and the photosensor 39 generates an electrical signal which is amplified in the amplifier 40. The differentiators 41 and 42 differentiate the signal which is applied to a bistable multi-vibrator 43 and the mono-stable multi-vibrator 44. These signals are compared in the anti-coincidence circuit 45 and a hold signal is generated which locks the signal on the pressure indicator 34 indicating the intraocular pressure when a predetermined force is applied on the probe 2. The waveforms at the output of the various circuit components are indicated adjacent the components. The system operates generally similar to that disclosed in FIG. 1 except a linear differentiator transformer is used in combination with a scanning disc.

FIG. 3 illustrates a modification of the probe 50 whereby a plurality of fibers are positioned in a linear manner on the eye contacting surface 51 and are arranged in a circular array on the scanning end 52. The scanning disc 53 has a single slit 54 which scans as the disc is rotated by the motor 55. Each fiber end of the plurality of fibers is scanned once for every revolution of the disc 53. The signal is sensed by a photosensor similar to the photosensor 15, or 39 and the signal is applied to the electrical circuit to provide a readout as described in the previous circuits. The coherent relationship of the fibers in the probe is necessary to provide the same fiber relationship in the inlet as well as the outlet of the probe. The modification shown in FIG. 3 provides that each of the laminations or parallel rows of fibers are correlated in their sequence of location in an arcuate manner to indicate to the sensor the diameter of the meniscus circle.

The device set forth above will be described in the following paragraphs. Referring to FIG. 1 the fiber bundle 1 forms the probe which has a planar surface 3 which engages a portion of the eyeball. The relative position of every fiber in the surface 3 must be correlated to form a similar relative position on the exit surface 4 of the probe. A light signal initiated responsive to a luminous meniscus of the surface 3 is transmitted through the bundle to provide an image of the signal at the surface 4.

The light source 22, merely for the purpose of illustration, may be in the blue region of the spectrum as an excitation light which causes fluorescein which is placed in the eye to fluoresce creating a yellow-green image or an image of greater wavelength than the excitation light of the meniscus of fluid in the eye. The probe 2 is pressed against the eye causing a flattening of a portion of the eye and a meniscus ring is formed around the flattened area. The area of the flattened portion of the eye increased with an increase in the force on the probe. When a predetermined area of the eye is flattened a predetermined diameter of the meniscus ring is formed on the eye which is transmitted through the probe and initiates a "hold" signal which is described subsequently.

The scanner 13 rotates the slit 12 generating a signal in the photosensor 15 which is amplified in the amplifier 16. The double differentiator circuits 17 and 18 generate negative pulses which are applied to the bistable multi-vibrator 19 to generating a gating voltage. The width of these pulses is proportional to the time space between the pulses from the output of the differentiator 18. The same pulses are applied to the mono-stable multi-vibrator 20. The mono-stable multi-vibrator will generate a gating voltage pulse of constant width which is applied to the anti-coincidence circuit 21. When a gating pulse is not present on the output of the mono-stable multi-vibrator 20 and the gating pulse is present on the bistable multi-vibrator 19 then the anti-coincidence circuit 21 generates a triggering pulse or "holding" pulse which locks the pressure indicator 11 to indicate the intraocular pressure for a predetermined diameter of the meniscus ring on the eyeball. It is understood the electrical read-out means is merely illustrative and not limitive and that any suitable read-out may be used.

The displacement of the probe relative to the housing while applanating the eye also generates an electrical signal proportional to the displacement. This signal is amplified and provides a read-out in units of intraocular pressure. This device provides a means whereby the only requirement of the operator is that he apply the contacting surface 3 of the probe on the eyeball in a tangential manner. Even if the surface 3 of the probe is not concentric on the eyeball surface the reading will be accurately recorded. There is no need for measuring the diameter for the contacting surface as this is automatically done by the electronic circcuit, nor is there any need for reading the meter during applanation as a hold feature retains the reading for a predetermined applanated surface diameter.

The preferred embodiments of this invention have been described and illustrated and it is understood that other modifications might be devised which would fall within the scope of the attached claims.

We claim:

1. An applanation tonometer comprising a probe having a surface adapted for engaging the cornea of an eye, supporting means supporting said probe for relative movement in response to the force applied to said probe, a transducer on said supporting means coupled to said probe for generating a signal corresponding to the force applied to said probe, recording means receiving said signal for indicating the force applied on said probe, an optical system relaying an image corresponding to the area of contact of said probe with the eye, photosensing means receiving said image of the area of contact of said probe, electrical means receiving said signal from said photosensing means for generating a hold signal when said probe contacts a predetermined size of area of the eye, and circuit means applying said hold signal to said recording means to fix the reading on said recording means when the end surface of said probe contacts said predetermined size of area of the eye.

2. An applanation tonometer comprising a probe having a surface area adapted for engaging the surface of an eye, an optical means relaying an image corresponding to the contact area on said probe through said probe, a supporting means reciprocally supporting said probe, a transducer on said supporting means coupled to said probe generating an electrical signal having linear response to the displacement of said probe relative to the supporting means, a recording device receiving said signal and indicating a reading in ocular pressure in response to displacement of said probe, a scanning device sequentially scanning said image relayed by said optical means for producing sequenced light pulses, a photosensor positioned to receive said light pulses for generating electrical signals responsive to the area of contact of said probe with the eye, generator means for generating a standard signal, electrical means coupled to said photosensor and said generator means to generate hold signal, and electrical means applying said hold signal to said recording device to fix the reading on said recording device corresponding to the magnitude of intraocular pressure in the eye.

3. An applanation tonometer comprising a probe having a plurality of fibers forming a multiple path light transmitting medium for transmitting therethrough an image of a meniscus contacting a planar surface on said probe, means reciprocally supporting said probe, a transducer mounted on said supporting means and coupled to said probe to indicate axial displacement responsive to force applied to said probe, pressure indicating means connected to said transducer to indicate the intraocular pressure, a scanning device repetitively scanning the image transmitted by said bundle of the fibers to provide scanned images of the meniscus engaging the receiving end of the probe, a photosensor positioned to receive said scanned images to generate time spaced signals responsive to the diameter of the meniscus engaging the receiving end of said probe, means for generating pulses, comparator circuit means comparing the time duration between said time spaced pulses with said gating pulses to generate a control signal when a preset time duration between said time spaced pulses is reached corresponding to a predetermined diameter of said meniscus and circuit means applying said control signal to said pressure indicating means to lock a reading corresponding to the intraocular pressure on said pressure indicating means.

4. An applanation tonometer comprising a probe reciprocally mounted in a supporting means, a transducer mounted on said supporting means generating an electrical signal in response to the linear displacement of said probe relative to said supporting means, a recording device receiving an electrical signal from said transducer and recording a pressure reading responsive to the magnitude of the force applied on said probe, an optical system relaying an image of the meniscus ring formed on the contacting surface of the image receiving end of the probe to the image emergent, a scanning device including a light chopper sequentially scanning the emergent surface of said probe, a photosensor sensing signals from said light chopper and generating time spaced pulses responsive to the diameter of a meniscus ring formed by the flattening surface of the cornea engaging the probe, circuit means for generating standard time pulses, circuit means comparing said time spaced pulses with said standard time pulses to genearte a control signal when the timing between said time spaced pulses exceeds the timing of said standard time pulses, and circuit means applying said control signal to said recording device to fix a reading corresponding to the intraocular pressure on said recording device.

5. An applanation tonometer comprising an image transmitting probe movably mounted in a supporting means adapted for engaging the surface of an eye and forming a meniscus ring on the contacting surface with the cornea, a linear differential transformer connected to the supporting means for said probe and generating an electrical signal of increasing magnitude in response to an increasing force applied to the probe, means for recording the intraocular pressure in response to the signal generated by said transformer, a scanning means and a photosensor generating a plurality of time spaced pulses responsive to the magnitude of the diameter of the flattened surface creating a meniscus ring on said probe, circuit comparator means receiving said time spaced pulses to generate and generating a triggering pulse when a predetermined diameter of a meniscus ring is formed on the engaging surface of said probe, and circuit means applying said triggering pulse to said recording means to lock a reading on said recording means.

6. An applanation tonometer comprising a probe supported for reciprocal movement relative to the supporting means for transmitting an image responsive to the area of contact through the probe, a transducer mounted on said supporting means and connected to said probe generating an electrical signal in response to the force applied to said probe, a recording device receiving the signal from said transducer and directly recording the intraocular pressure in the eye, a scanning device sequentially scanning the emergent end of the image transmitting probe and permitting passage of light signals to a photosensor, a photosensor receiving the light signals and generating time spaced pulses spaced in proportion to the diameter of the contacting arear of the probe with the eye, circuit means receiving said time spaced pulses for generating a triggering pulse when a contacting area of a predetermined idameter is present on said probe, and circuit means applying said triggering pulse to said recording device to fix the reading on said recording device.

7. An applanation tonometer comprising an image transmitting probe having a surface adapted for engaging a portion of an eye, supporting means supporting said probe for relative movement in response to a force applied on the surface of said probe, a transducer on said supporting means coupled to said probe for generating a signal responsive to the displacement of the probe relative to said supporting means, indicating means receiving the signal from said transducer and indicating the force applied on the surface of said probe, a photosensing means receiving an image responsive to the area of contact of the surface on said probe and generating an electrical signal that is a function of the size of the area of contact, electrical means receiving the signal from said photosensing means measuring said signal to generate a hold signal when the signal generated by said photosensing means corresponds to a predetermined size of the area of contact and circuit means applying said hold signal to said indicating means to fix the reading of said indicating means when said predetermined size of the area of contact is present on the surface of said probe.

8. An applanation tonometer comprising an image transmitting probe constructed and arranged of a plurality of fibers having their ends in parallel linear arrangement to form a surface adapted for engaging the surface of an eye to transmit therethrough an image corresponding to the size of the area of the eye engaged by said surface, supporting means supporting said probe for relative movement responsive to a force applied to the surface of said probe, a transducer on said supporting means coupled to said probe generating an electrical signal of a magnitude responsive to the displacement of the probe relative to the supporting means, indicating means receiving a signal from said transducer and indicating a reading responsive to the displacement of said probe, a scanning means continuously scanning said image transmitted by said probe, photosensing means receiving the scanned image of the area of contact of said probe to generate a signal that is a function of the size of said area of contact, electrical means receiving said signal to generate a hold signal when said photosensing means generates a signal corresponding to a predetermined size of area of contact on the surface of said probe, and circuit means applying said hold signal to said indicator to generate fixing the reading on said indicating means when said predetermined size of area of contact is made on the surface of the probe.

9. An applanation tonometer comprising an image transmitting probe constructed and arranged of a coherent bundle of fibers for engaging the surface of the eye, supporting means supporting said probe for relative movement responsive to a force applied on the end surface of said probe, a transducer on said supporting means coupled to said probe generating a signal responsive to the magnitude of displacement of said probe relative to the supporting means, indicating means receiving a signal from said transducer indicating a reading responsive to the magnitude of displacement of said probe, a photosensor means receiving said image for generating a signal that is a function of the magnitude of the area of contact of said probe with the eye, electrical means receiving said signal for generating a control signal when a signal is generated by said photosensor means corresponding to a predetermined magnitude of the area of contact and circuit means applying said control signal to said indicating means to fix the reading of said indicating means when a predetermined magnitude of area of contact of the probe is made.

10. An applanation tonometer comprising, radiation sensitive means for generating an electrical signal in response to radiation applied thereto, a movably mounted radiation transmitting probe having an end for engaging a portion of the surface of an eye to transmit radiation corresponding to the size of the area of the eye so engaged through said probe, means for positioning said radiation sensitive means to receive radiation transmitted through said probe, a transducer coupled to said probe for generating a signal that is the function of the force applied to an eye by said probe, scanning means periodically scanning said radiation transmitted by said probe so that said radiation sensitive means generates a periodic signal having a time duration that is a function of the size of the portion of the eye engaged by said probe, indicator means for providing a reading corresponding to intraocular pressure of an eye being tested, means coupling said radiation sensitive means and said transducer to said indicator means so that said indicator means automatically holds a reading corresponding to the intraocular pressure.

11. Apparatus for use in an applanation tonometer for measuring the size of the surface of an eye engaged by said tonometer comprising, radiation sensitive means for generating an electrical signal in response to radiation applied thereto, a radiation transmitting probe having an end adapted for engaging a portion of the surface of an eye to transmit radiation corresponding to the size of the area of the eye so engaged through said probe, means for mounting said radiation sensitive means for receiving radiation transmitted through said probe scanning, means periodically scanning said radiation transmitted by said probe so that said radiation sensitive means generates a periodic signal having a time duration that is the function of the size of the portion of the eye engaged by said probe, and circuit means coupled to said radiation sensitive means for measuring the time duration of at least a portion of said periodic signal.

References Cited

UNITED STATES PATENTS

| 3,036,153 | 5/1962 | Day | 81—1 XR |
| 3,049,001 | 8/1962 | Mackey et al. | 73—80 |
| 3,070,997 | 1/1963 | Papritz et al. | 73—80 |
| 3,150,520 | 9/1964 | Mackey et al. | 73—80 |
| 3,181,351 | 5/1965 | Stauffer | 73—80 |

JAMES J. GILL, *Acting Primary Examiner.*

R. C. QUEISSER, *Examiner.*

J. J. SMITH, *Assistant Examiner.*

UNITED STATES PATENT OFFICE
CERTIFICATE OF CORRECTION

Patent No. 3,338,089                               August 29, 1967

William F. Coombs, Jr., et al.

It is certified that error appears in the above identified patent and that said Letters Patent are hereby corrected as shown below:

Column 5, line 21, "of", first occurrence, should read -- to generate a signal corresponding to --. Column 6, line 36, cancel "comparator"; line 37, cancel " and generating"; line 55, "arear" should read -- area --; line 58, "idameter" should read -- diameter --.

Signed and sealed this 28th day of October 1969.

(SEAL)
Attest:

Edward M. Fletcher, Jr.                          WILLIAM E. SCHUYLER, JR.
Attesting Officer                                       Commissioner of Patents